United States Patent [19]

Nakanishi et al.

[11] Patent Number: 4,792,872
[45] Date of Patent: Dec. 20, 1988

[54] HOLDER STRUCTURE IN A CASSETTE PLAYER

[75] Inventors: Yasuyuki Nakanishi, Kyoto; Toshiyuki Ushiba, Osaka, both of Japan

[73] Assignee: Mitsubishi Denki Kabushiki Kaisha, Tokyo, Japan

[21] Appl. No.: 24,697

[22] Filed: Mar. 11, 1987

[30] Foreign Application Priority Data

Mar. 11, 1986 [JP] Japan ................................. 61-55459
Mar. 11, 1986 [JP] Japan ................................. 61-55462

[51] Int. Cl.$^4$ ............................................. G11B 15/66
[52] U.S. Cl. ..................................... 360/96.5; 360/93
[58] Field of Search ................. 360/94, 93, 96.5, 96.6

[56] References Cited

U.S. PATENT DOCUMENTS

| | | | |
|---|---|---|---|
| 3,735,939 | 5/1973 | Inaga | 360/132 X |
| 4,030,601 | 6/1977 | Ackeret | 360/96.5 X |
| 4,087,145 | 5/1978 | Weavers | 360/96.5 X |
| 4,345,283 | 8/1982 | Maryschka | 360/96.6 |
| 4,368,495 | 1/1983 | Hamanaka et al. | 360/97 |
| 4,402,024 | 8/1983 | Kato | 360/96.5 |
| 4,609,955 | 9/1986 | Sims, Jr. | 360/93 |

FOREIGN PATENT DOCUMENTS

| | | |
|---|---|---|
| 0125765 | 11/1984 | European Pat. Off. . |
| 0215663 | 3/1987 | European Pat. Off. . |
| 3010775 | 3/1980 | Fed. Rep. of Germany . |
| 3332157 | 3/1985 | Fed. Rep. of Germany ..... 360/96.5 |
| 56-71847 | 6/1981 | Japan .................................. 360/96.5 |
| 657628 | 9/1951 | United Kingdom . |
| 1237512 | 6/1971 | United Kingdom . |
| 1336589 | 11/1973 | United Kingdom . |
| 1432192 | 4/1976 | United Kingdom . |
| 1517049 | 7/1978 | United Kingdom . |
| 2050676 | 1/1981 | United Kingdom . |

Primary Examiner—John H. Wolff
Attorney, Agent, or Firm—Birch, Stewart, Kolasch & Birch

[57] ABSTRACT

A cassette holder structure in the information recording and/or reproducing apparatus which comprises a cassette holder supported by a support structure for movement between a cassette receiving position, at which the cassette holder is ready to receive the cassette, and a loaded position at which information can be recorded on or reproduced from the information carrier medium contained in the cassette, a generally elongated elastic releaseable catch member carried by the cassette holder and resiliently engageable with a detent member defined in the cassette, and means operable to disengage the releaseable catch member from the detent member in the cassette when and so long as the cassette holder is in the cassette receiving position and also to cause the releaseable catch member to be engaged with the detent member in the cassette when the cassette holder with the cassette inserted thereinto is moved from the cassette receiving position towards the loaded position.

6 Claims, 7 Drawing Sheets

HOLDER STRUCTURE IN A CASSETTE PLAYER

BACKGROUND OF THE INVENTION

1. Field of Technology

The present invention generally relates to an information recording and/or reproducing apparatus operable with the use of a cassette containing an information recording medium and, more particularly, to a cassette holder structure employed in such apparatus.

For the purpose of the present invention, the apparatus of the type referred to above includes a video tape recorder (VTR), a digital audio tape recorder (DAT) and the like, and, depending on the type of the apparatus, the information recording medium may be a length of magnetic recording tape, a magnetic disk, an optical disk or the like.

2. Description of the Prior Art

In describing an example of the prior art considered pertinent to the present invention, reference will be made to a video tape recorder and a cassette holder structure used therein, the prior art cassette holder structure being schematically shown in FIGS. 1 and 2 of the accompanying drawings.

Figure 1:
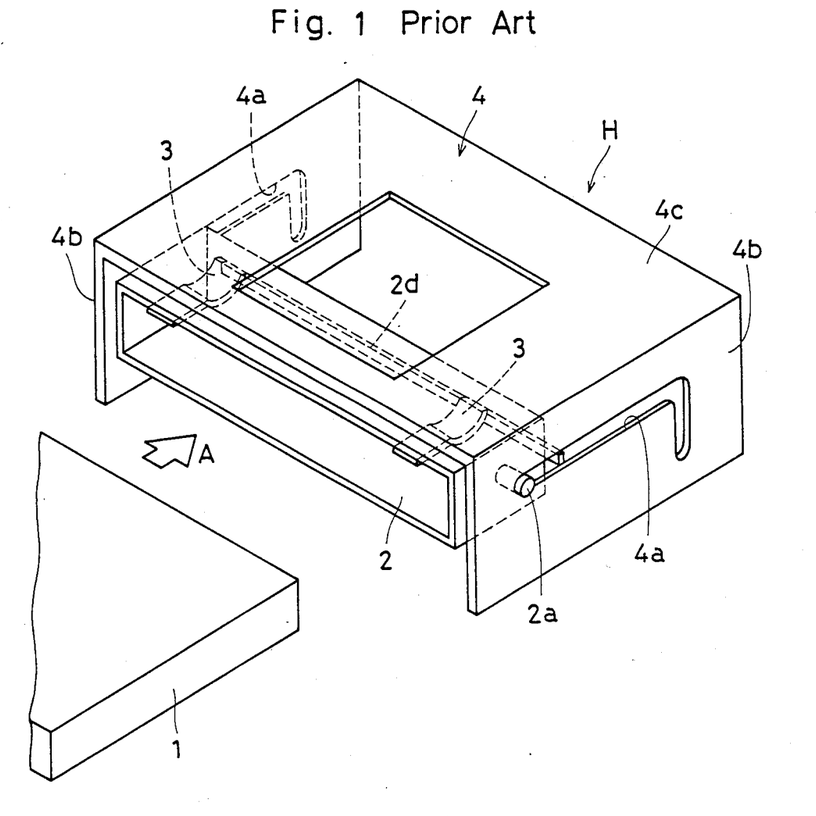
FIG. 1 is a schematic perspective view of the prior art cassette holder structure.
Figure 2:
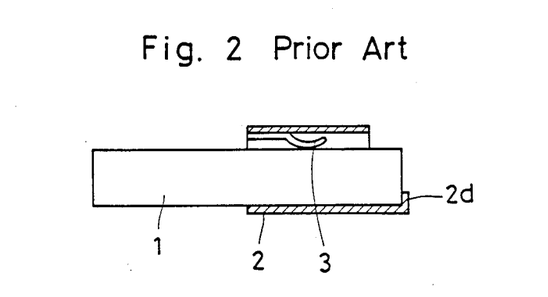
FIG. 2 is a schematic side sectional view showing the cassette holder having the cassette received therein in the prior art cassette holder structure shown in FIG. 1.

Referring first to FIG. 1, a generally rectangular, standardized cassette 1 is shown as held in position ready to be loaded in a holder structure generally identified by H. The holder structure H comprises a cassette holder 2 having a cassette receiving mouth defined therein for receiving the cassette 1 and supported for movement between a cassette receiving position, as shown therein, and a loaded position, a plurality of, for example, two retaining leaf springs 3 secured to a ceiling portion of the cassette holder 2 to confront the cassette receiving mouth so that, when the cassette 1 is inserted into the cassette receiving mouth in a direction shown by the arrow A, the cassette 1 so inserted can be retained in position within the cassette holder 2, and a support structure 4 including a pair of side walls 4b and a top wall 4c assembled together so as to represent a shape generally similar to the shape of an inverted figure "U", each of the side walls 4b having a respective guide slot 4a defined therein in alignment with each other.

The cassette holder 2 has a pair of pins 2a protruding outwardly therefrom in a direction away from each other and axially aligned with each other, the cassette holder 2 being movably supported with the pins 2a engaged in the respective guide slots 4a.

The prior art holder structure H is so designed and so structured that, when the cassette 1 is inserted into the cassette receiving mouth of the holder 2 and a continued external pushing force is applied to the holder 2 through the cassette 1, the holder 2 can be moved from the cassette receiving position towards the loaded position with the pins 2a guided along the guide slots 4a and can be subsequently drawn by a motor-driven cassette loader (not shown) towards the loaded position. As best shown in FIG. 2, when the cassette 1 is completely inserted into the cassette receiving mouth of the cassette holder 2, not only is a front edge of the cassette 1 brought into engagement with a stopper 2d integral with the cassette holder 2, but also the cassette 1 itself is substantially immovably held in position by the retaining springs 3.

However, it has been found that the prior art holder structure H of the above described construction poses the following problem. Since only the retaining springs 3 are an effective means for retaining the cassette 1, once inserted into the cassette holder 2, in position inside the cassette holder 2, and when during the loading of the cassette 1, that is, during the movement of the cassette holder 2 from the cassette receiving position towards the loaded position, the cassette 1 is loaded by reason of its contact with a component of the holder structure or by reason of shock and/or vibrations imposed thereon, the cassette 1 tends to deviate from the right position inside the holder 2 to such an extent that, when at the loaded position, it will not be correctly set in position relative to, for example, a cylinder drum supporting magnetic recording and/or reproducing heads. Once this happens, not only can the information recording medium, such as the magnetic tape, be damaged, but also the apparatus may fail to operate properly.

The above described problem may be somewhat alleviated if the biasing force of each of the retaining springs 3 is increased enough to firmly hold the cassette 1 inserted into the holder 2. However, the use of springs 3 of this type poses a problem in that a correspondingly increased resistance may act on the insertion of the cassette 1 into the cassette holder 2, causing an operator to feel uncomfortable when inserting the cassette 1 into the cassette holder 2 and also causing the casset 1 itself to be readily damaged.

SUMMARY OF THE INVENTION

Accordingly, the present invention has been devised to substantially eliminate the above discussed problems inherent in the prior art cassette holder structure in the information recording and/or reproducing apparatus and has for its primary object to provide an improved cassette holder structure effective to enable the operator to feel comfortable when inserting the cassette into the cassette holder while the cassette once inserted can be firmly retained and constrained in position inside the cassette holder.

Another important object of the present invention is to provide an improved cassette holder structure of the type referred to above, wherein any possible displacement of the cassette once inserted into the cassette holder which would result from the shock and/or vibrations imposed thereon is minimized or substantially eliminated.

In order to accomplish these objects, the present invention provides a cassette holder structure in the information recording and/or reproducing apparatus which comprises a cassette holder supported by a support structure for movement between a cassette receiving position, at which the cassette holder is ready to receive the cassette, and a loaded position at which information can be recorded on or reproduced from the information carrier medium contained in the cassette, a generally elongated elastic releaseable catch member carried by the cassette holder and resiliently engageable with a detent member defined in the cassette, and means operable to disengage the releaseable catch member from the detent member in the cassette when and so long as the cassette holder is in the cassette receiving position and also to cause the releaseable catch member to be engaged with the detent member in the cassette when the cassette holder with the cassette inserted thereinto is moved from the cassette receiving position towards the loaded position.

Preferably, the detent member defined in the cassette is in the form of a detent recess, and the releaseable catch member cooperable with the detent member comprises a catch block, carried by the cassette holder for movement between lifted and lowered positions and engageable with the detent member when at the lowered position, and a leaf spring having one end rigidly secured to the cassette holder and the other end adapted to urge the catch block towards the lowered position as the cassette holder is moved from the cassette receiving position towards the loaded position.

In one embodiment of the present invention, the means operable to selectively engage and disengage the releaseable catch member may comprise a finger assembly rigidly secured at one end to the support structure so as to extend between the support structure and the cassette holder in a direction conforming to the direction of movement of the cassette holder from the cassette receiving position towards the loaded position and also conforming to the direction in which the releaseable catch member extends from the cassette holder.

With this construction, the catch block of the elastic releaseable catch member can be maintained clear from the detent member in the cassette when and so long as the cassette holder is in the cassette receiving position, but can be lowered for engagement with the detent member in the cassette as the cassette holder is moved from the cassette receiving position towards the loaded position.

In another preferred embodiment of the present invention, the finger assembly is mounted on the cassette holder for movement together therewith and positioned between the support sructure and the cassette holder. The finger assembly is movable between retracted and projected positions in a direction conforming to the direction of movement of the cassette holder and independently of the movement of the cassette holder. However, when the cassette holder with the cassette received therein is moved a predetermined distance greater than a predetermined distance in a direction towards the loaded position, the finger assembly is moved to the retracted position while allowing the catch member to be lowered for engagement with the detent member, as clearly understood from the subsequent detailed description.

In practicing the present invention, the holder structure herein disclosed may, or may not, employ the retaining springs such as employed in the prior art holder structure. However, the use of the releaseable catch member in combination with the known retaining springs advantageously ensures a rigid and firm retainment of the once-inserted cassette in position inside the cassette holder.

The present invention will become more clearly understood from the following detailed description of preferred embodiments, when taken in conjunction with the accompanying drawings. However, the embodiments and the drawings are given for the purpose of illustration and explanation only, and are not to be taken as being limitative of the present invention in any way whatsoever, whose scope is to be determined solely by the appended claims. In the drawings, like reference numerals denote like parts in the several views.

BRIEF DESCRIPTION OF THE DRAWINGS

The invention is illustrated by way of the following drawings wherein.

DETAILED DESCRIPTION OF THE EMBODIMENTS

In describing the preferred embodiments of the present invention, and for facilitating a ready and better understanding thereof, the present invention will be described as applied to a cassette holder structure generally used in a video tape recorder, although it can be equally embodied in any information recording and/or reproducing apparatus utilizing an encased information carrier medium.

Referring first to FIGS. 3 to 6, the generally rectangular cassette 1 of any known construction containing therein an information carrier medium (not shown) has its top panel formed with a detent member which is, in this instance, shown in the form of a detent recess 5 positioned generally intermediately of the width thereof and adjacent a front edge thereof for the purpose of the present invention, it being noted that the terms "top" and "front" hereinabove and hereinafter referred to in connection with the cassette 1 are used in relation to the direction in which the cassette 1 is inserted into the cassette holder 2. The function of the detent recess 5 will be readily understood from the subsequent description.

The cassette holder structure H, to which the present invention is applicable, is generally similar to the prior art cassette holder structure shown and described with reference to FIGS. 1 and 2, as to the shape and manner in which the cassette holder 2 is supported by the support structure 4. More specifically, the support structure 4 is of a sectional representation similar to the shape of a generally inverted figure of "U" including, in addition to the pair of opposite side panels 4b having the respective guide slots 4a defined therein, a top panel 4c bridging between the side panels 4b so as to connect the latter together and having an opening 4d defined therein. On the other hand, the cassette holder 2 is positioned internally of the support structure 4 and comprises generally rectangular top and bottom walls 2b and 2c and a pair of side walls 2d all assembled together to define a generally rectangular sectioned cassette receiving mouth inside the cassette holder 2.

As is the case with the prior art holder structure, the cassette holder 2 has the pins 2a (only one of which is shown) rigidly secured to, or otherwise integrally formed with, the respective side walls 2d so as to protrude in the opposite directions away from each other in axially aligned relationship with each other. This cassette holder 2 is supported by the support structure 4 with the pins 2a engaged in the respective guide slots 4a in the side panels 4b of the support structure 4.

A releaseable catch member generally identified by 6 and adapted to be resiliently engaged in the detent recess 5 in the cassette 1 as the cassette holder 2 is moved away from the cassette receiving position for firmly retaining the cassette 1 in position within the cassette holder 2 comprises a generally elongated leaf spring 6a having one end rigidly secured exteriorly to the top wall 2b of the cassette holder 2 so as to extend away therefrom in a direction conforming to the direction of movement of the cassette holder 2 towards the loaded position and immediately above the path of movement of the detent recess 5 in the cassette 1. This releaseable catch member 6 also comprises a catch block 6b rigidly secured to the free end of the leaf spring 6a and having a pair of arms 6c formed integrally therewith or otherwise rigidly connected thereto so as to extend upwardly and laterally outwardly therefrom.

Figure 3:
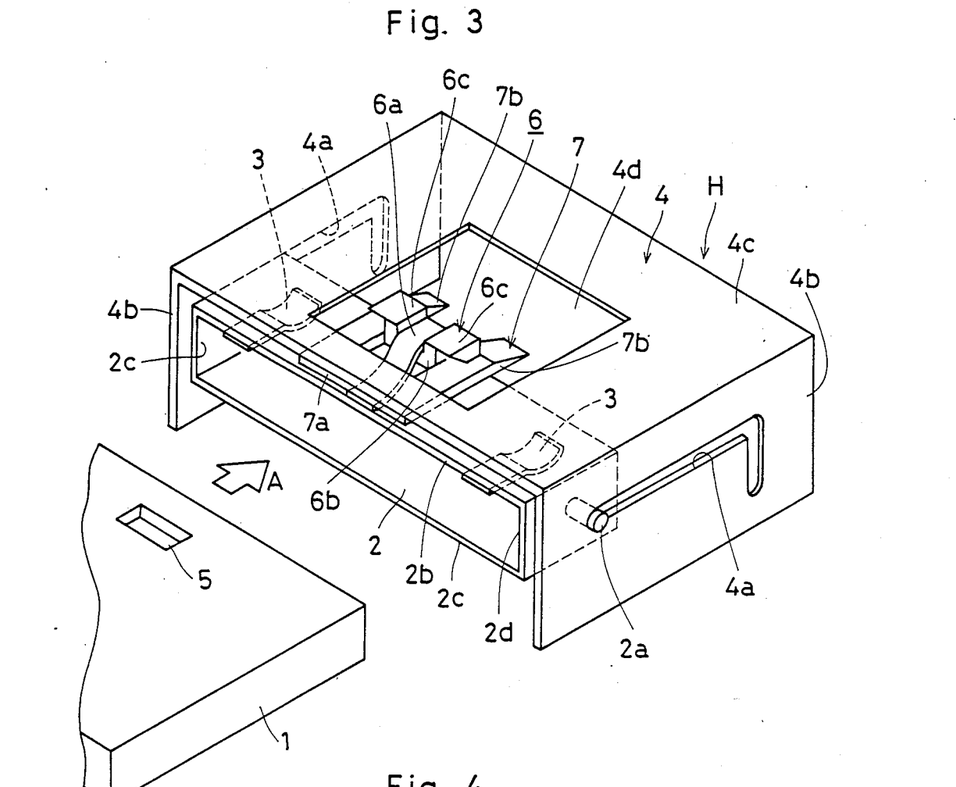
FIG. 3 is a schematic perspective view of a cassette holder structure according to a first preferred embodiment of the present invention with a cassette holder held at a cassette receiving position.
Figure 4:
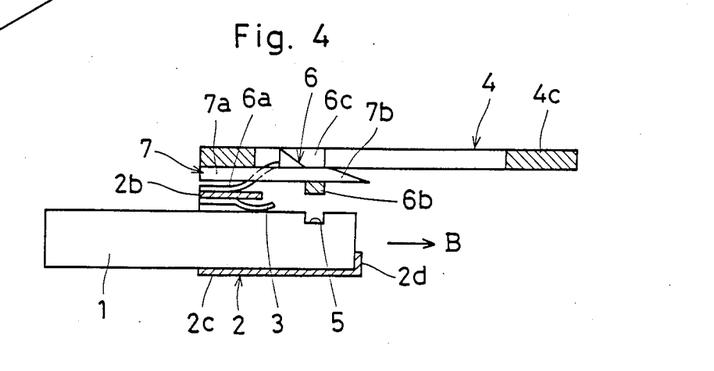
FIG. 4 is a schematic side sectional view showing a cassette received in the cassette holder, the cassette holder being shown as held at the cassette receiving position.

As best shown in FIGS. 3 and 4, so long as the cassette holder 2 is held in the cassette receiving position, the catch block 6b is held in position disengaged from the detent recess 5 in the cassette 1 by the reason which will now be described.

The cassete holder structure also comprises a finger assembly generally identified by 7 and being of a generally U-shaped configuration including an elongated base 7a and a pair of fingers 7b integral at one end with the base 7a. This finger assembly 7 is mounted on the top wall 2b of the cassette holder 2 with the base 7a rigidly secured thereto. With the finger assembly 7 so mounted, the fingers 7b extend outwardly therefrom on respective sides of the leaf spring 6a and in parallel relation to each other and also to the leaf spring 6a in a direction conforming to the direction of movement of the cassette holder 2 towards the loaded position, the fingers 7b being in turn exposed to the outside through the opening 4d in the top panel 4c of the support structure 4. Respective free ends of the fingers 7b remote from the base 7a are downwardly sloped so as to diverge away from the plane of the top panel 4c for the purpose which will become clear later.

So long as the cassette holder 2 is in the cassette receiving position, as shown in FIGS. 3 and 4, and so far as the cassette holder 2 is moved a predetermined distance from the cassette receiving position towards the loaded position, the arms 6c of the releaseable catch member 6 ride from above on the respective fingers 7b against the resiliency of the leaf spring 6a with the catch block 6b held in position between the top panel 4c of the support structure 4 and the top wall 2b of the cassette holder 2. However, after the cassette holder 2 has been moved a predetermined distance from the cassette receiving position by any known motor-driven cassette loader (not shown) and during the continued movement of the cassette holder 2 towards the loaded position, the arms 6c of the releaseable catch member 6 slide along the respective fingers 7b and then down along the sloped free ends thereof, finally snapping downwards so as to permit the catch block 6b to protrude beneath the plane of the top wall 2b of the cassette holder 2.

While the cassette holder structure according to the first embodiment of the present invention is constructed, as hereinbefore described, it operates in the following manner.

The insertion of the cassette 1 into the cassette receiving mouth of the cassette holder 2 in a direction shown by the arrow A in FIG. 3, until the front edge thereof is brought in abutment with the stopper 2d integral with the bottom wall 2, can be carried out in the same manner as with the prior art cassette holder structure shown in and described with reference to FIGS. 1 and 2. Once the cassette 1 is so inserted, the cassette 1 is retained inside the cassette holder 2 by the action of the retaining springs 3. Since at this time the catch block 6b is clear from the path of movement of the cassette 1 being inserted into the cassette holder 2 because the arms 6c rest on the respective fingers 7b, the insertion of the cassette 1 is in fact carried out smoothly.

Figure 5:
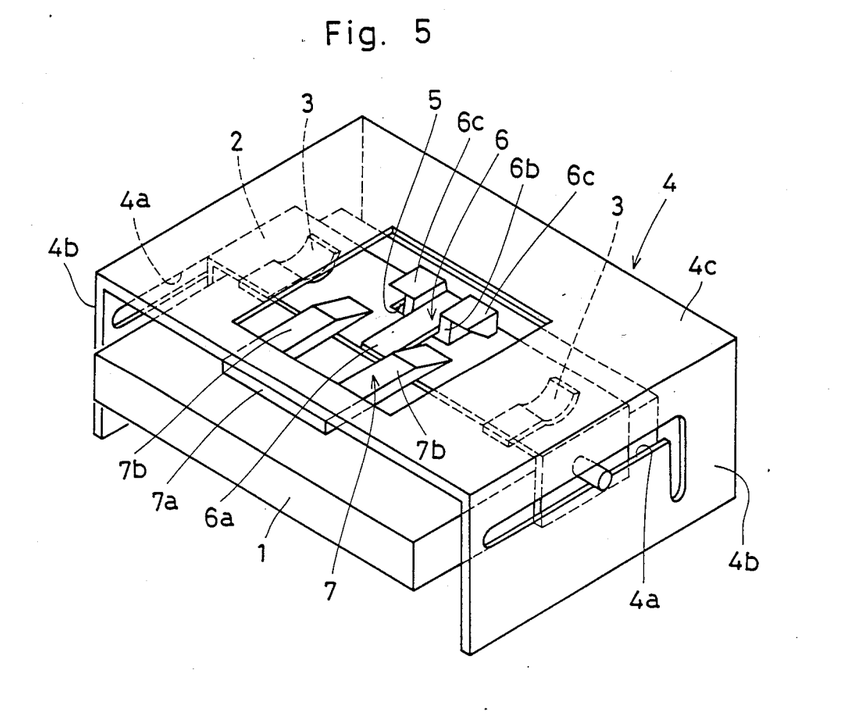
FIG. 5 is a view similar to FIG. 3, showing the cassette holder, after having received the cassette therein, being moved from the cassette receiving position towards a loaded position.
Figure 6:
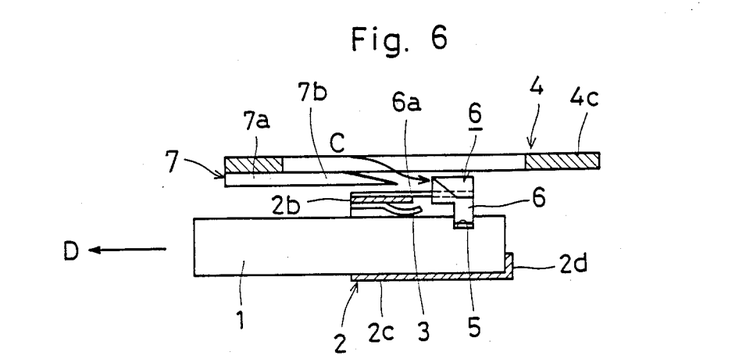
FIG. 6 is a view similar to FIG. 4, showing the cassette holder with the cassette received therein being moved towards the loaded position.

After the cassette 1 has been completely inserted into the cassette holder 2, the motor-driven cassette loader of any known construction is activated in response to the insertion of the cassette 1 to draw the cassette holder 2 with the cassette 1 therein from the cassette receiving position towards the loaded position. As the cassette holder 2 is moved in this way towards the loaded position, the arms 6c slide along the respective fingers 7b, and after the cassette holder 2 being so moved has moved a predetermined distance away from the cassette receiving position, the arms 6c slide down along the sloped free ends of the respective fingers 7b and then snap downwards by the resiliency of the leaf spring 6a with the catch block 6b consequently engaged into the detent recess 5 in the cassette 1 then held inside the cassette holder 2, as shown in FIGS. 5 and 6.

In this way, the cassette 1 inside the cassette holder 2 can be advantageously firmly constrained in position and will not undergo any substantial arbitrary motion within the cassette holder 2 which would otherwise occur when external impacts or shocks are applied thereto.

It is to be noted that the continued movement of the cassette holder 2 results in the arrival of the cassette holder 2 at the loaded position at which the cassette holder 2 with the pins 2a guided in the respective slots 4a has been lowered.

The disengagement of the catch block 6b once engaged in the detent recess 5 in the cassette 1 then held inside the cassette holder 2 takes place as the cassette holder 2 being returned from the loaded position towards the cassette receiving position approaches the cassette receiving position. More specifically, as the cassette holder 2 with the cassette 1 therein approaches the cassette receiving position by the reversed operation of the cassette loader, as is well known to those skilled in the art, the arms 6c are caught by the respective sloped free ends of the fingers 7b, riding over the latter with the catch block 6b consequently disengaged from the detent recess 5 in the cassette 1. Shortly before or substantially simultaneously with the arrival of the cassette holder 2 at the cassette receiving position, the catch block 6b is completely disengaged from the detent recess 5, as best shown in FIG. 4. Subsequent pull of the cassette 1 in a direction counter to the direction A of insertion of the cassette 1 results in the removal of the cassette 1 from the cassette holder 2.

Thus, it will be readily understood that the catch block 6b used in the foregoing embodiment is lifted against the leaf spring 6a for the disengagement from the detent recess 5 in the cassette 1 and lowered, as biased by the leaf spring 6a, for engagement into the detent recess 5, as the arms 6c ride above the fingers 7b and leave from the fingers 7b, respectively. In the embodiment of the present invention, which will be subsequently described with particular reference to FIGS. 7 to 13, the finger assembly 7 including the fingers 7b is, while it operates in a manner substantially similar to that in the foregoing embodiment, mounted on the cassette holder 2 for movement together therewith.

Figure 7:
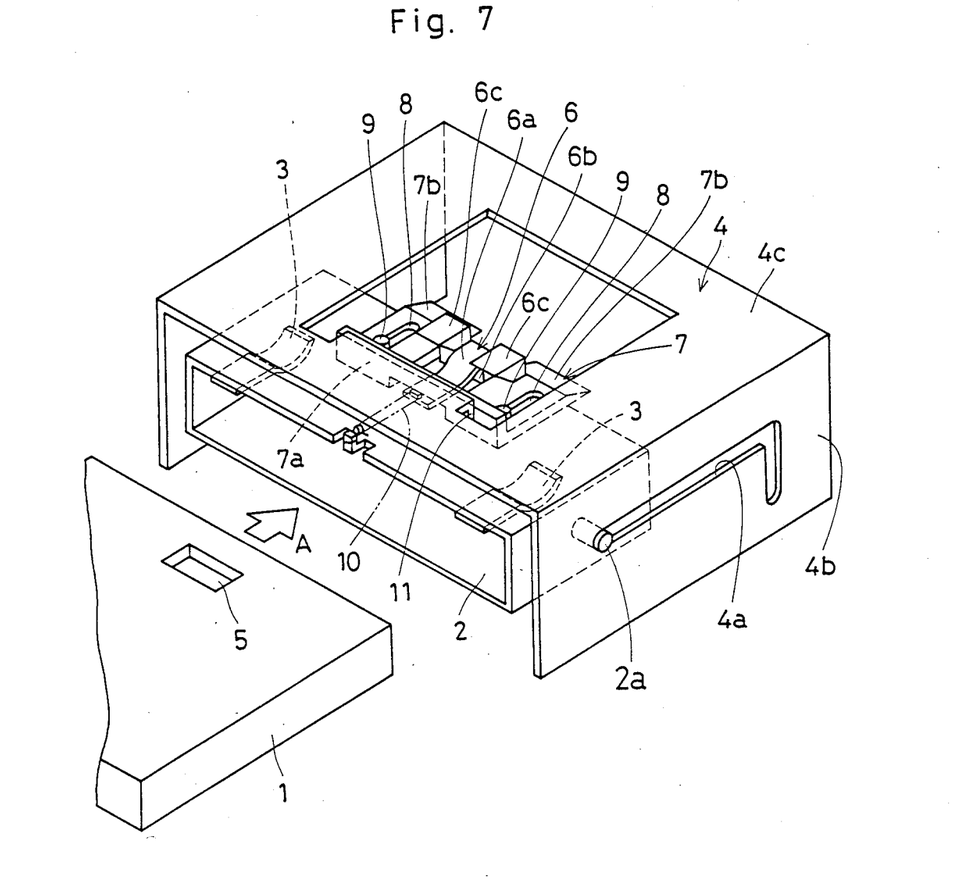
FIG. 7 is a schematic perspective view of the cassette holder structure according to a second preferred embodiment of the present invention with the cassette holder held at the cassette receiving position.

Referring now to FIGS. 7 to 13 and, particularly, to FIG. 7, the finger assembly 7 of the construction similar to that in the foregoing embodiment is mounted on the cassette holder 2 for movement between retracted and projected positions in a direction conforming to the direction of movement of the cassette holder 2 and positioned between the top wall 2b thereof and the top panel 4c of the support structure 4. The fingers 7b of the finger assembly 7 are formed with respective guide slots 8 into which respective guide posts 9 are relatively movably engaged. The guide posts 9 are rigidly mounted on the top wall 2b of the cassette holder 2 so as to project upwardly through the respective guide slots 8 in the fingers 7b, and, therefore, the finger assembly 7 as a whole can move a distance equal to the length of each guide slot 8. It is to be noted that the finger assembly 7 so mounted on the cassette holder 2 is supported in such a way that it will not detach from the top wall 2b of the cassette holder 2 and, for this purpose, free ends of the respective guide posts 9 which have passed through the guide slots 8 may be flattened so as to enlarge radially outwardly thereby to constrain the fingers 7b in position above the top wall 2b of the cassette holder 2.

Figure 8:
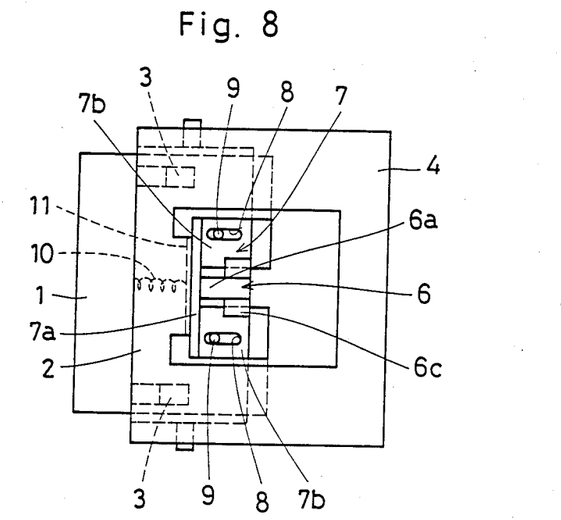
FIG. 8 is a schematic top plan view, on a somewhat reduced scale, of the cassette holder structure shown in FIG. 7, with the cassette holder shown as held at the cassette receiving position.
Figure 9:
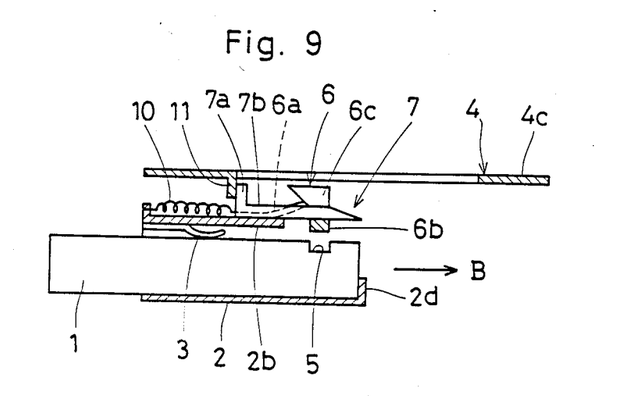
FIG. 9 is a schematic side sectional view of the cassette holder structure shown in FIG. 7, showing the cassette holder receiving the cassette therein and held at the cassette receiving position.

A coil spring 10 is interposed between the cassette holder 2 and the finger assembly 7 so that the latter can tend to assume the retracted position, as shown in FIGS. 8 and 9. In the illustrated instance, the coil spring 10 has one end connected to a portion of one side edge of the top wall 2b confronting the cassette 1 and the other end connected to a portion of the base 7a of the finger assembly 7, intermediate between the fingers 7b.

The finger assembly 7 is, when the cassette holder 2 is in the cassette receiving position as shown in FIGS. 8 and 9, held at the projected position against a pulling force exerted by the coil spring 10, with the catch block 6b consequently lifted. This is because, when the cassette holder 2 is in the cassette receiving position, the base 7a of the finger assembly 7 is held in abutment with a stopper 11 formed integrally with the top panel 4c so as to project downwardly into a space between the top wall 2b of the cassette holder 2 and the top panel 4c.

The cassette holder structure according to the second preferred embodiment of the present invention is so designed and so operable that, after the cassette 1 has been inserted into the cassette holder 2 in the direction A, as shown in FIG. 7, and when the cassette holder 2 with the cassette 1 received therein is subsequently moved a predetermined distance by the cassette loader from the cassette receiving position towards the loaded position, the finger assembly 7 is moved from the projected position towards the retracted position as pulled by the coil spring 10. This movement of the finger assembly 7 by the action of the coil spring 10 takes place relative to the cassette holder 2 and independently of the movement of the cassette holder 2 with the guide posts 9 moving within the respective guide slots 8. The condition in which the cassette holder 2 has been moved the predetermined distance towards the loaded position and the finger assembly 7 is relatively moved to the retracted position as pulled by the coil spring 10 is best illustrated in FIGS. 10 and 11.

Figure 10:
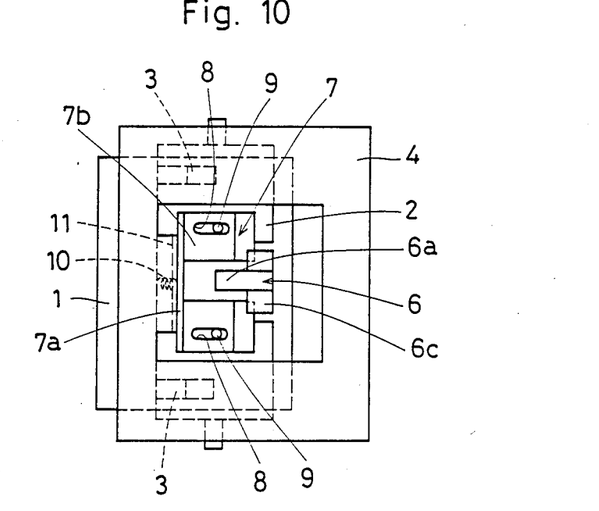
FIG. 10 is a view similar to FIG. 8, showing the cassette holder with the cassette received therein being moved from the cassette receiving position towards the loaded position.
Figure 11:
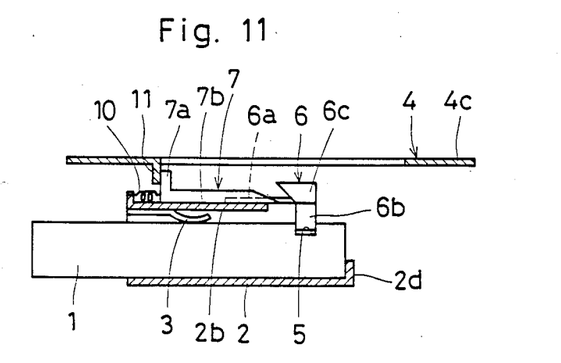
FIG. 11 is a view similar to FIG. 9, showing the cassette holder with the cassette received therein being moved from the cassette receiving position towards the loaded position.

As can be understood from the comparison between FIG. 9 and FIG. 11, as the finger assembly 7 is moved from the projected position towards the retracted position as pulled by the coil spring 10 during the movement of the cassette holder 2 towards the loaded position in a direction shown by the arrow B in FIG. 9, the fingers 7c slide relative to the arms 6c then resting thereon and finally allow the arm 6c to disengage therefrom, with the consequence that the catch block 6b is lowered by the action of the leaf spring 6a for engagement into the detent recess 5 in the cassette 1, then retained inside the cassette holder 2, substantially simultaneously with the arrival of the finger assembly 7 at the retracted position as shown in FIGS. 10 and 11.

Figure 12:
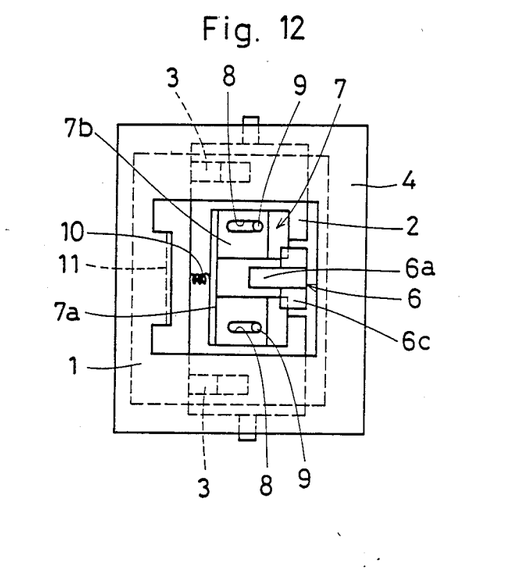
FIG. 12 is a view similar to FIG. 8, showing the cassette holder with the cassette received therein being further moved towards the loaded position.
Figure 13:
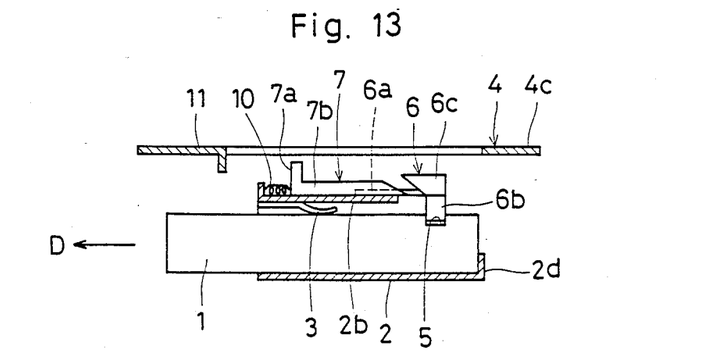
FIG. 13 is a view similar to FIG. 9, showing the cassette holder with the cassette received therein being further moved towards the loaded position.

During the continued movement of the cassette holder 2, with the cassette 1 therein, towards the loaded position, the finger assembly 7 while held at the retracted position moves together with the cassette holder 2, as shown in FIGS. 12 and 13. Nevertheless, subsequent to the lowering of the catch block 6b and, hence, the engagement of the catch block 6b into the detent recess 5 in the cassette 1, and until the cassette holder 2, being returned from the loaded position towards the cassette receiving position in a direction shown by the arrow D in FIG. 13, approaches a position spaced the predetermined distance from the cassette receiving position, the cassette 1 is not only retained in position by the retaining springs 3, but also constrained in position inside the cassette holder 2 by the catch block 6b engaged in the detent recess 5.

When the cassette holder 2 being returned from the loaded position approaches that position spaced the predetermined distance from the cassette receiving position, the base 7a of the finger assembly 7 is brought into contact with the stopper 11 in a manner substantially as shown in FIGS. 8 and 9, and therefore, the continued movement of the cassette holder 2 towards the cassette receiving position permits the finger assembly 7 to move against the coil spring 10 relative to the cassette holder 2 in a direction counter to the direction of movement of the cassette holder 2 towards the cassette receiving position. In this way, the finger assembly 7 is moved from the retracted position towards the projected position with the arms 6c consequently lifted onto the fingers 7b to disengage the catch block 6b from the detent recess 5.

Although the present invention has fully been described in connection with the preferred embodiments thereof with reference to the accompanying drawings, it is to be noted that various changes and modifications can readily be conceived by those skilled in the art.

For example, although the releaseable catch member 6 has been described and shown as comprised of the leaf spring 6a having its free end rigidly mounted with the catch block 6b, the leaf spring 6a and the catch block 6b may be of one-piece construction and this can be accomplished by the use of plastics molding.

Moreover, in the last mentioned embodiment of the present invention, the coil spring 10 may not be always limited to that shown and described, but may be in any form, for example, a tension spring or a compression spring, and the position thereof may be selected in consideration of the type of a particular spring so far as the finger assembly 7 can be moved in the manner as hereinbefore described.

Furthermore, each of the guide slots 4a defined in the side panels 4b of the support structure 4 may not be so shaped as shown, but may be straight depending on the type of the apparatus to which the present invention is applied.

Accordingly, such changes and modifications are to be construed as included within the spirit and scope of the present invention as defined by the appended claims unless they depart therefrom.

What is claimed is:

1. A cassette holder structure in an information recording and/or reproducing apparatus operable with the use of a cassette containing an information carrier medium, which structure comprises:
   a support structure;
   a cassette holder supported by said support structure for movement between a first position, at which the cassette holder is ready to receive a cassette housing an information carrier medium, and a second position at which information can be recorded on or reproduced from said information carrier medium contained in said cassette;
   a detent member defined in and juxtapositioned to a front edge of said cassette;
   a generally elongated elastic releaseable catch member carried by said cassette holder and resiliently engageable with said detent member defined in said cassette; and
   a finger assembly secured to said support structure to be engaged with said elastic releaseable catch member to disengage said catch member from said detent member in the cassette when said cassette holder is moved to said first cassette receiving position, but to be disengaged from said elastic releaseable catch member so that said catch member will engage said detent member in the cassette when said cassette holder with the cassette inserted therein is moved a predetermined distance from said cassette receiving first position towards said second information recording and/or reproducing position.

2. The holder structure of claim 1, wherein said elastic releaseable catch member comprises a generally elongated leaf spring member having one end rigidly secured to said cassette holder, and a catch block rigidly mounted on the other end of said leaf spring member and engageable with said detent recess in said cassette.

3. The holder structure of claim 2, wherein said detent member is a detent recess defined in said cassette.

4. The holder structure as claimed in claim 1, wherein the information carrier medium is a medium selected from the group consisting of a magnetic tape, a magnetic disk and an optical disk.

5. A cassette holder structure in an information recording and/or reproducing apparatus operable with the use of a cassette containing an information carrier medium, which structure comprises:
   a support structure;
   a cassette holder supported by said support structure for movement between a first position, at which the cassette holder is ready to receive a cassette housing an information carrier medium, and a second position at which information can be recorded on or reproduced from said information carrier medium contained in said cassette;
   a detent member defined in and juxtapositioned to a front edge of said cassette;
   a generally elongated elastic releaseable catch member carried by said cassette holder and resiliently engageable with said detent member defined in said cassette;
   a finger assembly mounted on said cassette holder for movement in a direction conforming to the direction of insertion of said cassete into said cassette holder;
   a spring member interposed between said finger assembly and cassette holder for urging said finger assembly in a direction counter to the direction of insertion of the cassette into the cassette holder, thereby effecting said finger assembly to disengage from said elastic releaseable catch member for engagement with the detent member by the effect of its own resiliency as the cassette holder is moved a predetermined distance from said first position towards said second position; and
   a stopper member provided on said support structure for halting said finger assembly against said spring member when said cassette holder is moved to said first position, such that said finger assembly engages with said elastic releaseable catch member to disengage the latter from said detent member against the resiliency of said elastic releaseable catch member.

6. The holder structure as claimed in claim 5, wherein the information carrier medium is a medium selected from the group consisting of a magnetic tape, a magnetic disk and an optical disk.

* * * * *